Jan. 21, 1969  T. P. MURRAY  3,422,678

APPARATUS AND METHOD FOR MEASURING TEMPERATURES

Filed May 12, 1966  Sheet 1 of 8

INVENTOR.
THOMAS P. MURRAY
By Donald G. Dalton
Attorney

INVENTOR.
THOMAS P. MURRAY
By Donald G. Dalton
Attorney

FIG. 15.

No. 5 Melted Tinplate Sample

Blackbody Reference at 411°F.

FIG. 16.

Crystalline Galvanized Sample
Blackbody Reference at 508°F.

United States Patent Office 3,422,678
Patented Jan. 21, 1969

3,422,678
APPARATUS AND METHOD FOR MEASURING
TEMPERATURES
Thomas P. Murray, Pittsburgh, Pa., assignor to United
States Steel, a corporation of Delaware
Filed May 12, 1966, Ser. No. 549,545
U.S. Cl. 73—355                               40 Claims
Int. Cl. G01k *11/00*

ABSTRACT OF THE DISCLOSURE

An improved method and apparatus for measuring temperature of a body by directing blackbody thermal radiation onto the body, detecting the polarization of the combined direct thermal radiation and reflected thermal radiation from the body, and receiving and transforming the combined direct thermal radiation and reflected thermal radiation from the body into an electrical signal.

Background of the invention

This invention relates to an apparatus for and method of measuring the surface temperature of a body and more particularly to an apparatus for and method of measuring the surface temperature of a body by the degree of polarization of a combined beam of thermal radiation emitted by and reflected by the body.

In measuring the temperature of a body by emitted thermal radiation, the quantity of emitted thermal radiation depends not only on the temperature of the body but also on surface characteristics of the body. These characteristics are lumped into a factor (i.e., emittance) which must be evaluated before accurate temperature measurements can be made from the thermal radiation emitted by the body.

A maximum thermal radiation per unit area, per unit time is emitted by a blackbody having no surface reflectance and with the thermal radiation from the interior of the body passing unimpeded through the surface of the body. Blackbody sources of this kind are constructed by forming a cavity in an opaque material and viewing this cavity through a relatively small opening, which opening provides an area of zero reflectance. The thermal radiation from such a blackbody source depends only on the temperature of the blackbody, and this blackbody source has an emittance of 1.0. All non-blackbody sources at the same temperature emit less thermal radiation per unit area, per unit time and thus have emittances of less than 1.0.

Kirchoff's Law states that when a blackbody source and a sample surface are at the same temperature, the fraction of blackbody thermal radiation emitted by the sample surface is equal to the fraction of blackbody thermal radiation absorbed by the sample surface. Assuming that thermal radiation from a blackbody falls on a sample surface at some angle, say 45 degrees, and that the sample surface is examined by a radiation detector at a reflection angle of 45 degrees, and that the blackbody and the sample surface are at the same temperature, then the total signal (reflected thermal radiation plus emitted thermal radiation) received by the radiator detector is the same as if the radiation detector were sighted directly at the blackbody at that temperature. Theoretical considerations indicate that when a radiation detection means is provided for sighting alternately on a heated blackbody and on the thermal radiations of the blackbody reflected by the sample surface, a null difference signal will be observed only when the sample surface and the blackbody are at the same temperature.

The above analysis assumes that the fraction of the incident beam of thermal radiation from the blackbody which does not arrive at the radiation detector has been absorbed by the sample surface. This assumption is erroneous because it assumes as absorbed that portion of the incident beam of thermal radiations which has been randomly scattered by the surface.

Objects of the invention

It is the general object of the present invention to avoid and overcome the foregoing and other difficulties of and objections to prior art practices by the provision of an improved apparatus and method for measuring temperatures, which apparatus and method:

(a) Determines the temperature of a sample surface by measurement of the polarization of the thermal radiation (both emitted and reflected) from the sample surface;

(b) Eliminates the correction for the emittance factor of the sample surface;

(c) Does not require a polished sample surface and can be used on samples of various surface finishes including oxide coatings;

(d) Locates a null and eliminates quantitative measurements, thereby eliminating compensation of the radiation detector for thermal and aging effects (within a relatively large range); and (e) Provides a correct reading even when the emittance of the sample surface is changing (as by oxidation) during the course of the temperature measurement.

Brief summary of the invention

The aforesaid objects of the present invention, and other objects which will become apparent as the description proceeds, are achieved by providing apparatus for measuring the temperature of a body and having a frame, blackbody means on the frame adjacent the body and adapted to direct thermal radiations onto the body, thermal radiation detection means on the frame adjacent the body for receiving and transforming combined direct thermal radiation and reflected thermal radiation from the body into a signal, and analyzer means adjacent the thermal radiation detection means and having a transmission direction adapted to detect the polarization of the combined direct thermal radiation and reflected thermal radiation from the body.

An improved method is also provided for measuring temperature of a body comprising the steps of directing blackbody thermal radiation onto the body, detecting the polarization of the combined direct thermal radiation and reflected thermal radiation from the body, and receiving and transforming the combined direct thermal radiation and reflected thermal radiation from the body into a signal.

Brief summary of the several views of the drawings

For a better understanding of the present invention reference should be had to the accompanying drawings, wherein like numerals of reference indicate similar parts throughout the several views and wherein:

FIGURES 15–19 are reproductions of recorder charts or graphs showing the difference (or error) signal from the polarized radiation detector wherein indicated temperatures are sample temperatures as measured by a thermocouple, and wherein.

Although the principles of the present invention are broadly applicable to an apparatus for and a method of measuring temperatures, the apparatus and method of the present invention are particularly adapted for measuring surface temperatures of a heated body by the degree of polarization of a combined beam of thermal radiation emitted by and reflected by the body and hence it has been so illustrated and will be so described.

*Detailed description*

Figure 1:
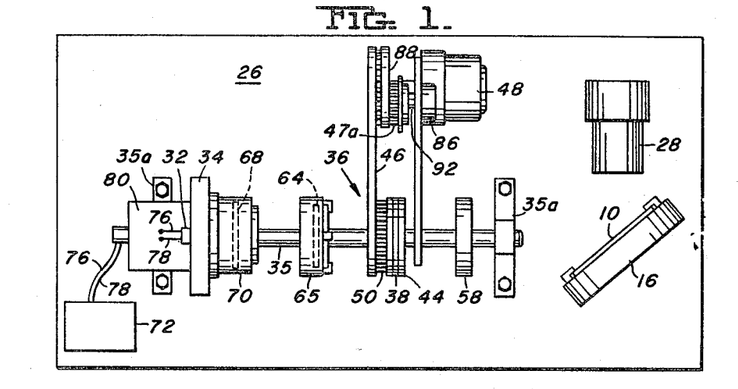
FIGURE 1 is a plan view of the apparatus of the present invention.
Figure 1A:
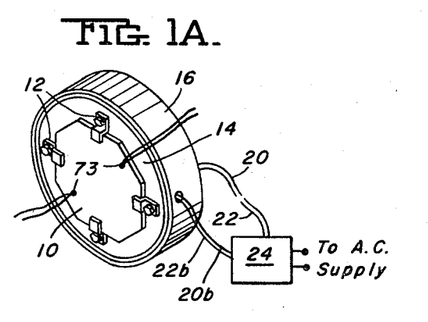
FIGURE 1a is an isometric view of the work sample and its heating means.
Figure 2:
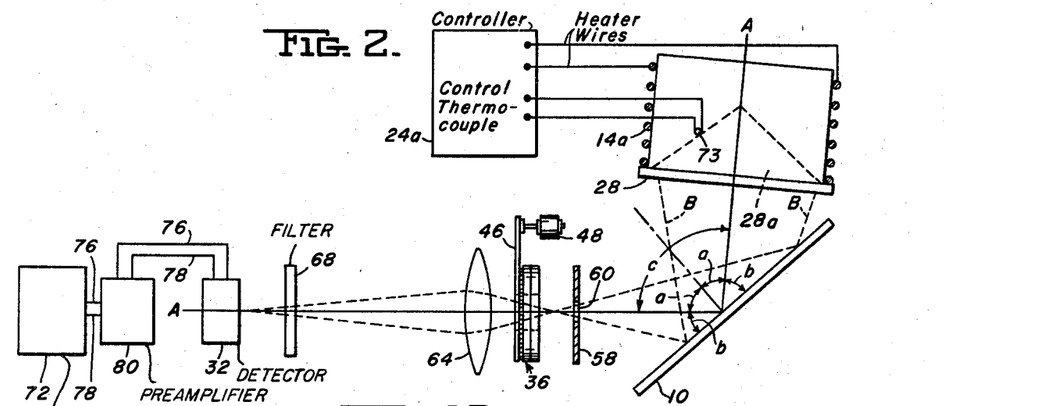
FIGURE 2 is a diagrammatic plan view of the apparatus shown in FIGURE 1.

With specific reference to the form of the present invention illustrated in the drawings, and referring particularly to FIGURES 1, 1a and 2, a body, such as a heated work sample, is indicated generally by the reference numeral 10.

Figure 3:
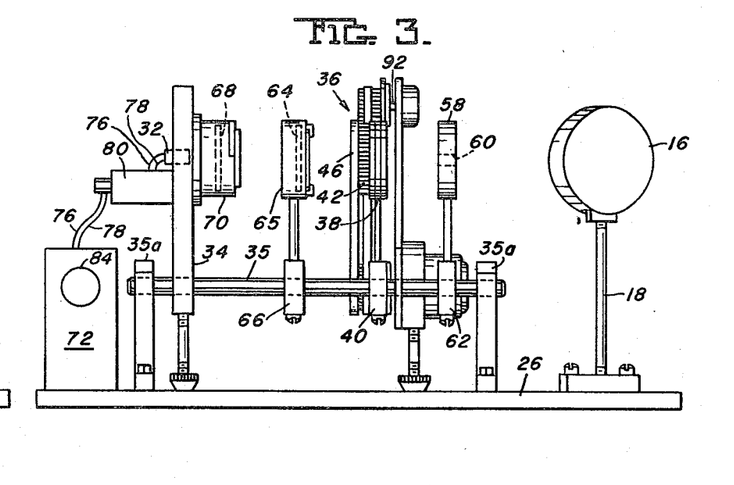
FIGURE 3 is a side elevational view of the apparatus shown in FIGURE 1.
Figure 4:
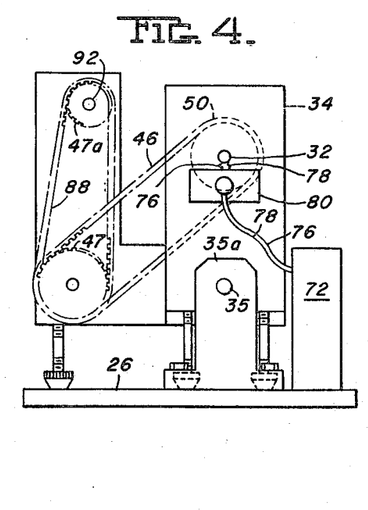
FIGURE 4 is an end elevational view of the apparatus shown in FIGURE 1 and showing the detector means and analyzer means.
Figure 5:
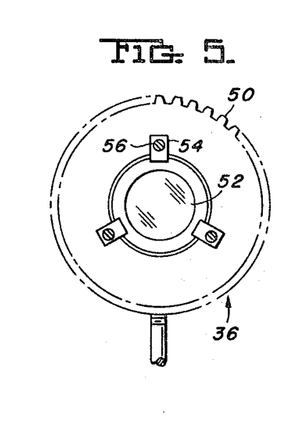
FIGURE 5 is an end elevational view of the rotating analyzer assembly.
Figure 6:
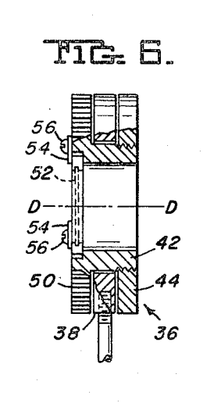
FIGURE 6 is a side elevational view partly in section of the rotating analyzer assembly.

This work sample 10 (FIGURE 1a) is mounted by clips 12 to a copper disc-type electric heater 14 contained in a housing 16, which housing 16 is in turn mounted on a rod 18 (FIGURE 3). Conductors 20, 22 connect the heater 14 to a controller 24 (FIGURE 1a) of the type manufactured by the Norbatrol Electronics Corporation, 356 Collins Ave., Pittsburgh, Pa., as an "Electric Tracing Controller." The thermocouple shown as conductors 20b, 22b supplies a temperature output signal to the controller 24.

Figure 1B:
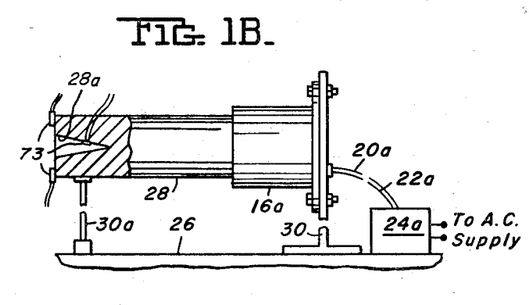
FIGURE 1b is a side elevational view of the blackbody and its heating means.

The apparatus of the present invention for measuring the temperature of the work sample 10 has a frame or table 26 (FIGURES 1, 1b, 3, 4). A blackbody means is provided, such as a flat metal plate, similar to the work sample 10 (FIGURE 1a) coated with a material of high emittance, such as flat black paint (not shown) or alternatively (FIGURES 1, 1b) a blackbody 28 (FIGURES 1, 2) similar to Type 11–201, manufactured by Barnes Engineering Company and provided with about a 3.0 inch diameter aperture 28a (FIGURES 1b, 2). This blackbody 28 is disposed on a housing 16a (FIGURE 1b) containing a heating means 14a (FIGURE 2), which heating means 14a is connected by conductors 20a, 22a (FIGURE 1b) to a controller 24a. The housing 16a is mounted by brackets 30, 30a on the table 26 (FIGURE 1b) so that the aperture 28a in the blackbody 28 is at an angle of about 90 degrees with respect to the optical axis A—A (FIGURE 2) of the apparatus. The field of view of a detector 32 (FIGURES 1, 2, 3, 4) is indicated by the dotted lines B—B (FIGURE 2). The work sample 10 is disposed at an angle b with respect to the optical axis A—A (FIGURE 2).

This thermal radiation detection means or device 32 is similar to a lead sulfide photoconductive sensor for the infrared of the type manufactured by Eastman Kodak Company, Rochester, N.Y., as the Ektron Detector. The device 32 is mounted by a bracket 34 (FIGURES 1, 3, 4) on a bar 35 having brackets 35a upstanding from the frame 26 adjacent the work sample 10 for measuring the combined thermal radiation from the sample 10. The thermal radiation detection device 32 consists of a photoconductive substance deposited with conducting electrodes on a glass or other dielectric base. Changes in thermal radiation produce changes in resistance in the thermal radiation detection device 32 and such resistance changes are observed as an electric signal. The thermal radiation detection device 32 functions as a pure Ohm's Law resistor with no diode effect. The device 32 is not subject to microphonics and the sensitive area may be almost any size or shape with maximum sensitivity in the infrared region of the spectrum.

Analyzer means, such as the analyzer assembly 36 (FIGURES 1, 2–6) having a transmission direction adapted to detect the polarization of the combined direct thermal radiation and reflected thermal radiation from the sample 10, is mounted at 40 (FIGURE 3) on the bar 35 adjacent the detector 32.

Referring to FIGURES 1, 3, 5 and 6, the bracket 40 of the analyzer assembly 36 has a stationary hollow center member 38 (FIGURES 1, 3, 6), the hollow member 38 providing a bearing surface for a hollow hub 42. This hub 42 carries a hollow member 44 secured to the hub 42 and connected by a belt 46 (FIGURES 1, 3, 4) to a gear 47 (FIGURE 4) on a motor 48. A rotatable toothed hollow carrier flange 50 (FIGURES 1, 4–6) of the hub 42 has mounted therein a plastic infrared analyzer 52 (FIGURES 5, 6) of the type simular to a 2-inch Diameter Plastic Laminated Infrared Linear Polarizer produced by Polaroid Corporation, Rochester, N.Y. The optical line of sight is indicated by the dotted line D—D in FIGURE 6. Such analyzer 52 is secured in the carrier flange 50 by clips 54 (FIGURES 5, 6) and screws 56.

For the purpose of insuring that the field of view of the detector 32 is filled by both the sample 10 and the blackbody aperture 28a, limiting means, such as the field stop or diaphragm 58 (FIGURES 1, 2, 3) provided with the aperture 60 is mounted at 62 on the bar 35 of the table 26 (FIGURE 3). In order to focus the combined direct thermal radiation and reflected thermal radiation from the sample 10 onto the detector 32, a lens 64 (FIGURES 1, 2, 3) of the double-convex type is mounted in a housing 65 (FIGURES 1, 3) at 66 (FIGURE 3) on the bars 35. The device utilized to select a predetermined wave length band of the combined direct thermal radiation and reflected thermal radiation from the sample 10 is a filter 68 (FIGURES 1, 2, 3) of the interference type mounted at 70 (FIGURES 1,3) on housing 34 adjacent the detector 32. In order to provide storage means, an oscilloscope 72 (FIGURES 1, 2, 3, 4, of the type manufactured by Tektronics, Inc. as a No. 564 Storage Oscilloscope) is mounted on the table 26 adjacent the detector 32 for receiving the electrical signal from the detector 32 and for indicating the magnitude of the signal. Conductors 76, 78 (FIGURES 1, 2, 3, 4) connect the detector 32 to the oscilloscope 72 through a preamplifier 80 of the type similar to Model DP–2C Photoconductive—All Type Preamplifier, manufactured by Barnes Engineering Company, and utilized for amplifying the electrical signal produced by the detector 32.

If the combined thermal radiation beam is unpolarized, the rotating analyzer 52 generates a uniform resultant beam. When the combined thermal radiation beam is polarized a variable resultant beam is generated by the analyzer 52. Where the combined thermal radiation beam is constant, the detector 32 generates a constant output. When the combined thermal radiation beam is variable, the detector 32 generates an alternating signal shown on a screen 84 of the oscilloscope 72 in FIGURE 7. If a permanent record is required, the output from the detector 32 is fed to an automatic recording device (not shown).

To find the temperature of the sample 10, two readings are taken with the blackbody 28 at different temperatures. The amplitudes of the alternating electrical signal from the detector 32 are different, the smaller being the one for the blackbody temperature closer to the sample temperature. The blackbody temperature is changed in the proper direction and readings are taken until the A-C signal from the detector 32 passes through a null (FIGURE 7) and begins to increase. The temperature of the sample 10 is approximately the blackbody temperature for this null reading.

Figure 7:
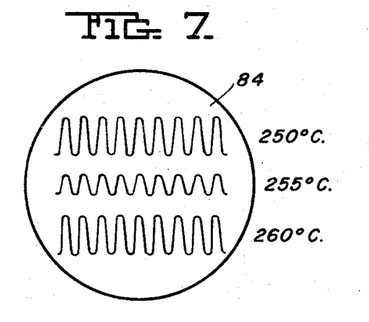
FIGURE 7 is a front elevational view of an oscilloscope.

In FIGURE 7, the screen 84 of the storage oscilloscope 72 demonstrates the change in the amplitude of the output signal, and shows a null at 255° C. The A-C signal increases both for a blackbody temperature of 250° C. and for a temperature of 260° C.

Table I below shows data on eleven samples 10 of three different metals with varying surface finishes and oxide coatings.

TABLE I

| Type of Sample | Surface Finish | Approximate Emittance | Blackbody Temperature | Measured Sample Temperature |
|---|---|---|---|---|
| Carbon Steel | 1#5 | 0.30 | 412 | 400 |
| Do | 2#7 | 0.20 | 424 | 440 |
| Do | 1#7 | 0.35 | 498 | 513 |
| Melted Tinplate | #7 | 0.11 | 412 | 406 |
| Do | #3 | 0.15 | 405 | 409 |
| Unmelted Tinplate | #7 | 0.11 | 414 | 421 |
| Do | #3 | 0.15 | 390 | 397 |
| Remelted Galvanized | | 0.47 | 403 | 411 |
| Do | | 0.47 | 505 | 515 |
| Crystalline Galvanized | | 0.07 | 498 | 513 |

¹ Oxidized.  ² Clean.

Figure 9:
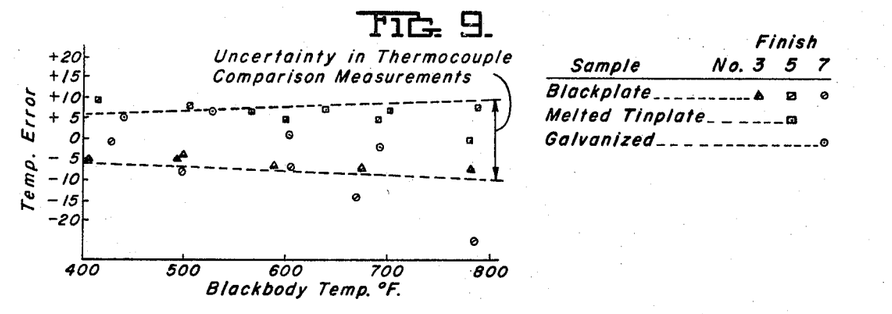
FIGURES 9, 10 are graphs showing the difference in temperatures as measured by the apparatus of this invention and as measured by comparison thermocouples welded to the work samples.
Figure 10:
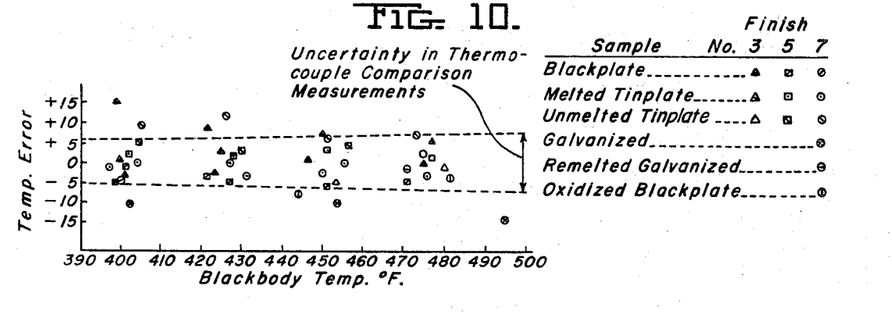

FIGURES 9, 10 show additional data similar to that shown in Table I above indicating the difference in temperatures measured by the apparatus and by thermocouples 73 (FIGURE 1a) welded to the work sample 10.

In Table I the largest errors are about 4 percent of actual temperature, which errors can be reduced by compensating for systematic errors. For example, the blackbody 28 had an emittance of less than one and therefore emitted less radiation than an ideal blackbody, such blackbody error being corrected by calibration. The systematic error was calculated as the mean of the differences between blackbody temperature and measured sample temperatures, and the data was corrected for this error (FIGURES 9, 10).

For operation of the apparatus in manufacturing plants, the rotating analyzer 36 is protected by a window (not shown and selected for absence of polarizing effects). For a particular temperature measurement application, the addition of other lenses 64, filters 68, or other optical components may be desirable. The readout system is capable of many variations. The null can be determined directly, and can also be determined by measuring equal increments on two sides of the null. The apparatus can be operated either to control sample temperature, by placing the blackbody 28 at the desired operating temperature and varying the temperature of the sample 10 to be controlled in accordance with the magnitude and phase of the detector output, or to measure the sample temperature as described above.

The differences between the reference temperatures and the sample temperatures are composed of (1) a systematic error, and (2) random errors. Table I shows the total error in the first data taken. FIGURES 9 and 10 show only the random errors in later data, after correcting for the systematic error.

A systematic error is unavoidable in any instrument. For example, it is impossible to position both the sample 10 and the blackbody 28 at the same distance from the detector 32. In working at distances which are relatively short as compared to the focal length, the different target distances of blackbody 28 and source 10 result in the need for a systematic correction, even though the field of view is filled. The systematic error can be determined and corrected for.

The random errors shown in Table I and in FIGURES 9 and 10 fall mostly within the random error band expected in the measurements. The temperatures of the sample 10 and blackbody 28 are measured by thermocouples 73 (FIGURES 1a, 1b). These are considered precise within about ±1 percent.

The random error in the difference of the two thermocouples 73 is 1.4 percent. Most of the plotted data falls within this error band, which is shown by the dotted lines in FIGURES 9 and 10.

There are relatively few points in FIGURES 9, 10 showing a random error greater than that expected from the methods of measurement, and even for these, the discrepancy is not large.

Of these points, the largest negative error is shown for crystalline galvanized (Table I), which has the lowest emittance of any sample 10 and some of the largest positive errors by unmelted tinplate (FIGURE 10), which has the second lowest emittance. Therefore, the errors do not show any systematic dependence on emittance.

These results shown in FIGURES 9 and 10 demonstrate that the method is independent of emittance to a very high degree.

This apparatus and method determine the temperature of a test surface 10 by examining for polarization the sum of (1) the radiation signal emitted by the test surface 10, and (2) the radiation signal emitted by a blackbody 28 and reflected from the test surface 10. The equality of the temperature of blackbody 28 and test surface 10 is detected by the condition that the sum of the reflected plus emitted beams is unpolarized. The radiation emitted by a blackbody 28 is unpolarized, but when blackbody radiation is reflected from a surface 10 at other than normal incidence the reflected beam is polarized because the components of polarization in and perpendicular to the plane of incidence (FIGURE 8 which components were originally equal) are affected differently by the reflection and hence differ in phase and amplitude. The emitted beam is also polarized. But assume Kirchoff's Law (emission equals absorption) holds for each mode of emission and absorption of an object. If 10 percent of the component of polarization $E_p$ (FIGURE 8) in the plane of incidence BOA is absorbed, the emission of this component $E_p$ is likewise 10 percent, when the blackbody 28 and surface 10 are at the same temperature. Therefore the polarization of the emitted radiation compensates for the polarization of the reflected beam, and the resultant beam is unpolarized. If the emittance of the target 10 should increase by 20 percent, the absorptance will also increase by 20 percent, so that the increase in emitted radiation will be compensated by the decrease in reflected radiation.

In this approach, the absolute value of the radiation signal is no longer being measured. The fact that part of the signal from the blackbody 28 may be scattered, and not reach the detector 32, is no longer of importance, provided that this does not affect the polarization of the signal. At least to a very good approximation, the polarization of the reflected signal seen by the detector 32 is caused only by absorption. But this polarization is complementary to the polarization of the emitted beam, by Kirchoff's Law. Therefore, even in the presence of scattering, which occurs for all actual (even mirror) surfaces 10, the equality of temperatures of the blackbody source 28 and the sample 10 can be determined by the absence of polarization in the resultant beam.

Also, when the beam is examined for polarization, the absolute value of the emittance becomes much less important in determining sensitivity.

The results shown in Table I and FIGURES 9, 10 show that accurate measurements have been made on targets 10 of a wide range of emittance, without any correction for emittance.

*Alternate embodiments*

It will be understood by those skilled in the art that alternative embodiments of the above-described apparatus are contemplated.

Figure 8:
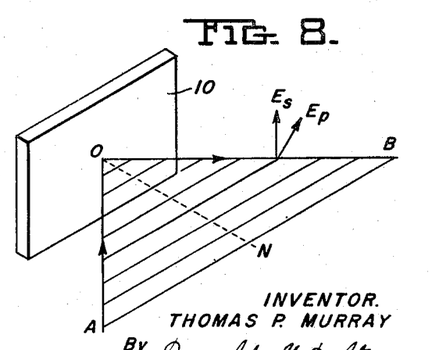
FIGURE 8 is an isometric schematic view showing the work sample and the plane of incidence.
Figure 12:
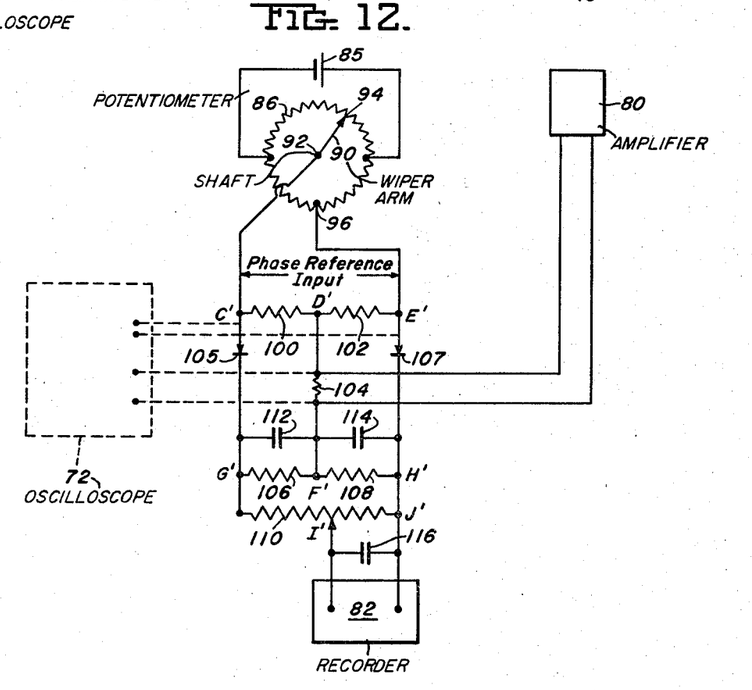
FIGURE 12 is a schematic diagram of an alternative embodiment showing phase reference means.

As shown in FIGURE 12, a reference voltage generating means, such as the potentiometer 86 of the type Model 206 sine-cosine potentiometer, manufactured by Computer Instruments Corporation, 92 Madison Ave., New York, N.Y., is connected by a belt 88 on gears 47, 47a (FIGURES 1, 4) to the motor 48 to provide a reference voltage whose output is a function of the angular position of the analyzer 52. A wiper arm 90 (FIGURE 12) of the potentiometer 86 connected to the D-C source of supply 85 is carried by a rotating shaft 92 (FIGURES 1, 3, 4, 12). As the wiper arm 90 rotates, a sinusoidal voltage is generated between a wiper tap 94 (FIGURE 12) and another tap 96 on the potentiometer 86. The angular position of the potentiometer 86 is adjusted on its drive shaft 92 so that the positive maximum of its alternating output coincides with the passage of the transmission axis (D—D, FIGURE 6) of the analyzer 52 through the position parallel to the plane of incidence BOA (FIGURE 8). If the sample 10 is much hotter than the reference blackbody 28, the maximum signal generated by the rotating analyzer 52 then occurs at the same time as the maximum signal generated by the potentiometer 86, so that the two signals are in phase, as shown on the screen 84 in FIGURE 13. If the sample 10 is much colder than the blackbody 28, then the minimum signal generated by the rotating analyzer 52 occurs at the same time as the maximum signal generated by the rotating potentiometer 86, so that the two signals are out of phase (FIGURE 14).

One alternative embodiment provides a D-C output signal whose magnitude and polarity indicate whether the sample 10 is hotter or colder than the reference 28, and by how much. The possibility of obtaining such an output is based on the fact that the radiation signal falling on the detector 32 changes phase as the signal passes through the null (FIGURE 7) or, more strictly, through the minimum.

The radiation falling on the rotating analyzer 52 is composed both of radiation emitted by the blackbody reference 28 and reflected from the sample 10, and of radiation emitted directly by the sample 10. Consider first the reflected radiation. Although, in the embodiment shown in FIGURES 1–8, the angle of incidence of this beam on the sample 10 is not single-valued (as would be the case for a collimated beam), the beam can still be considered as consisting of two orthogonal linearly polarized components (FIGURE 8), one component $E_p$ in which the electric vector is parallel to the plane of incidence BOA, and one component $E_s$ in which the electric vector is perpendicular to the plane of incidence BOA (FIGURE 8). (These components will be referred to hereafter as the "parallel" component, $E_p$ and the "perpendicular" component, $E_s$.) Furthermore, it has been shown that these directions are the axes of the resultant elliptically polarized beam, so that the maximum and minimum transmission of the reflected radiation by the rotating analyzer 52 occurs at these orientations of the transmission axis of the rotating analyzer 52.

The beam of radiation emitted by the sample 10 can be similarly treated, except that its minimum intensity ocurs at the analyzer orientation where the maximum of the reflected signal is transmitted, and its maximum coincides with the minimum for the reflected signal.

Figure 11:
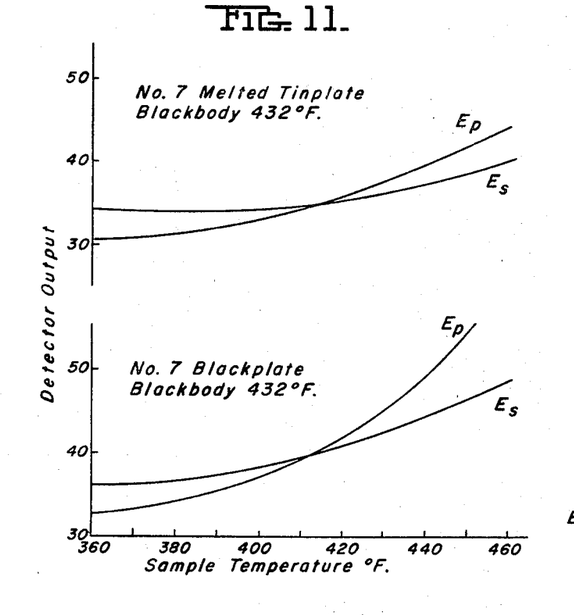
FIGURE 11 is a graph showing relative amplitudes of the two components of polarization as a function of temperature.

The nature of metallic emittance is such that at angles of incidence, a (FIGURE 2) of the order of 70°, as are used in the apparatus, the parallel component $E_p$ (FIGURE 8) is greater than the perpendicular component $E_s$ for radiation emitted by the sample 10 (FIGURE 2). Conversely Kirchoff's Law (that emittance equals absorptance) holds for each component of radiation, the perpendicular component $E_s$ of the radiation coming from the blackbody 28 and reflected from the sample 10 is greater than the parallel component $E_p$ of this reflection. FIGURE 11 shows data demonstrating this effect, such data being taken with the analyzer 52 alternately in the two fixed positions parallel and perpendicular to the plane of incidence BOA, with the radiation chopped by a mechanical chopper (not shown). As the sample 10 becomes progressively hotter than the reference 28, the emitted radiation (and hence the $E_p$ component) becomes predominant. Hence, if the sample 10 is hotter than the blackbody 28, the maximum of the alternating signal seen by the detector 32 occurs when the transmission axis of the analyzer 52 is parallel to the plane of incidence BOA, and conversely if the sample 10 is colder than the blackbody 28, the maximum in the alternating signal occurs when the transmission axis of the analyzer 52 is perpendicular to the plane of incidence BOA. To identify which of these conditions prevails, a means of generating an electrical signal which is a function of the angular position of the analyzer 52 is attached to the analyzer assembly 36 or its drive system 46, 47, 48 (FIGURES 1, 4), so that the phase relation between this signal and the primary signal referred to above defines where the maximum signal occurs.

To obtain an automatic readout of this type, the following components are added to the apparatus already described (FIGURES 1–8); (1) a reference voltage source, such as the battery 85 and potentiometer 86 (FIGURE 12), whose output is a function of the angular position of the analyzer 52, and (2) a readout system (FIGURE 12) which can detect the phase as well as the magnitude of the output of the radiation detector 32.

The signal from the potentiometer 86 is fed to voltage divider 100, 102 of a phase discriminating circuit (FIGURE 12), and the output signal generated by the rotating analyzer 52 is fed to terminals D', F' of the phase discriminating circuit from the amplifier 80. The output of amplifier 80, instead of being fed to the oscilloscope 72 of FIGURE 2 is fed in this embodiment to the readout system of FIGURE 12.

Figure 13:
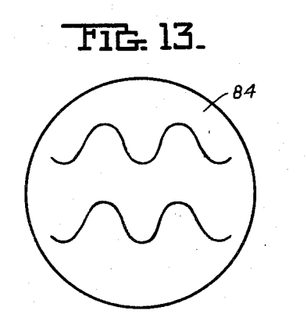
FIGURES 13, 14 are oscilloscope traces showing reference signal and input signal from the thermal radiation detection means.
Figure 14:
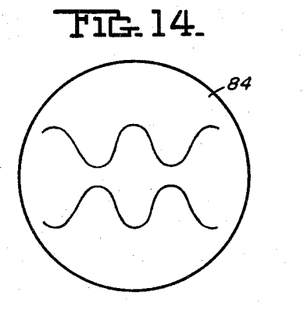

To determine the phase relationship between the output from the amplifier 80 and the reference output, such outputs are connected temporarily to the oscilloscope 72, results of which are shown in FIGURES 13, 14.

If the signal is in phase (FIGURE 13) with the reference output, terminal C' is positive with respect to terminal D' when terminal D' is positive with respect to terminal F'. Then the voltages across resistors 100 and 104 add, and those across resistors 104 and 102 are opposed. As a result, a larger pulsating D-C voltage from diode 105 of diodes 105, 107 appears across resistor 106 than across resistor 108. These voltages are smoothed by condensors 112 and 114 and fed to the D-C recorder 82 (or control system), with added filtering by condenser 116, and a positive voltage (defined as terminal I' positive with respect to terminal J') appears on the recorder 82. If conversely, the signals are out of phase (FIGURE 14), the terminal C' is negative with respect to terminal D' when terminal D' is positive with respect to terminal F', then a larger pulsating voltage appears across resistor 108 than across resistor 106, and the recorder output becomes negative. For the purpose of adjusting the temperature span indicated on recorder 82, a variable resistor 110 is disposed across terminals G', H'.

The recorder output is thus positive, with the conventions adopted, if the sample 10 is hotter than the blackbody 28 (FIGURE 13), and is negative if the sample 10 is colder than the blackbody 28 (FIGURE 14). The magnitude of the signal indicates the magnitude of the temperature difference between the sample 10 and the blackbody 28.

Figure 15:
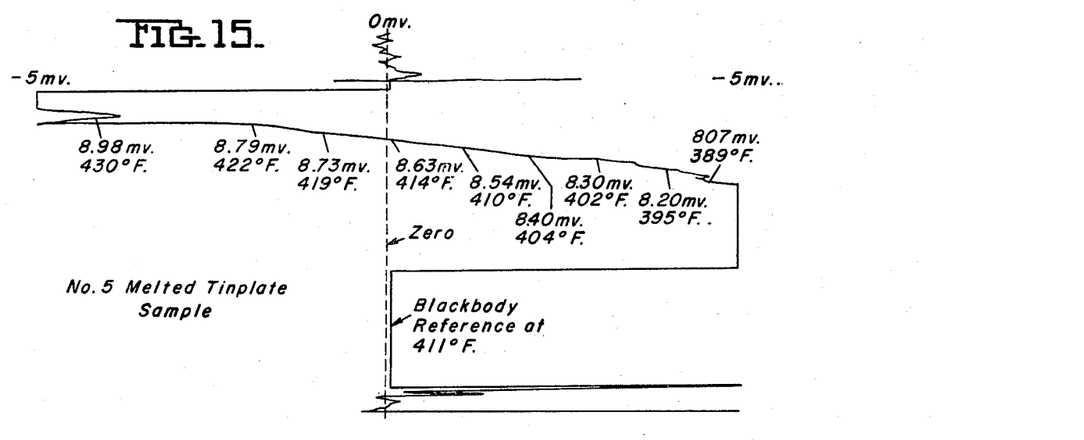
FIGURE 15 shows a No. 5 melted tinplate sample, blackbody reference at 414° F. and a null output for the sample at 411° F.

Results obtained with the fully automatic apparatus (FIGURES 12–14) are shown in FIGURES 15–19. These FIGURES 15–19 show recorder charts of the output at I', J' of the fully automatic apparatus (FIGURE 12). This output is a continuous indication of the difference between the set-point of the reference blackbody 28 and the actual sample temperature. The recorder 82 has a mid-chart zero, so that if there are no errors in the measurement, the recorder graph should pass through zero when reference 28 and sample 10 are at the same temperature. For example, FIGURE 15 shows results obtained on a sample 10 of No. 5 melted tinplate with the reference blackbody temperature set at 411° F., as the sample 10 was heated up through the reference temperature. As the sample 10 was heated, the temperature was continuously monitored by means of a thermocouple 73 (FIGURE 1a) attached to its surface. The numbers written on the graph are thermocouple millivoltages read out by one individual on a potentiometer (not shown) of the type made by Leeds & Northrup Company as Type N and marked on the chart 82 by another individual as the heating proceeded. After the run, the corresponding temperatures from a calibration table for the thermocouples 73 were then indicated on the chart 82. Initially, the recorder indication was off scale to the right, and came on scale at a sample temperature of about 389° F. At this point, the error signal was about 5 millivolts for the 22° F. temperature difference. As the sample 10 heated, the error signal continually decreased, and the indication passed through zero at a sample temperature of about 414° F. (3° F. different than the reference temperature.

Figure 16:
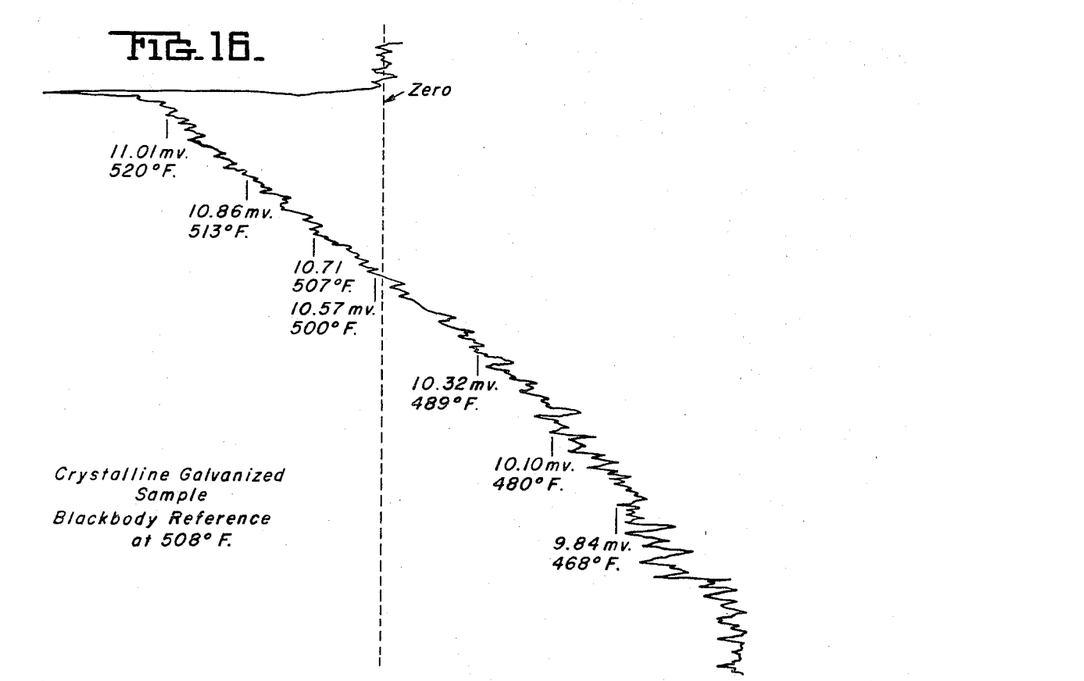
FIGURE 16 shows a crystalline galvanized sample, blackbody reference at 508° F., and a null output for the sample at 500° F.
Figure 17:
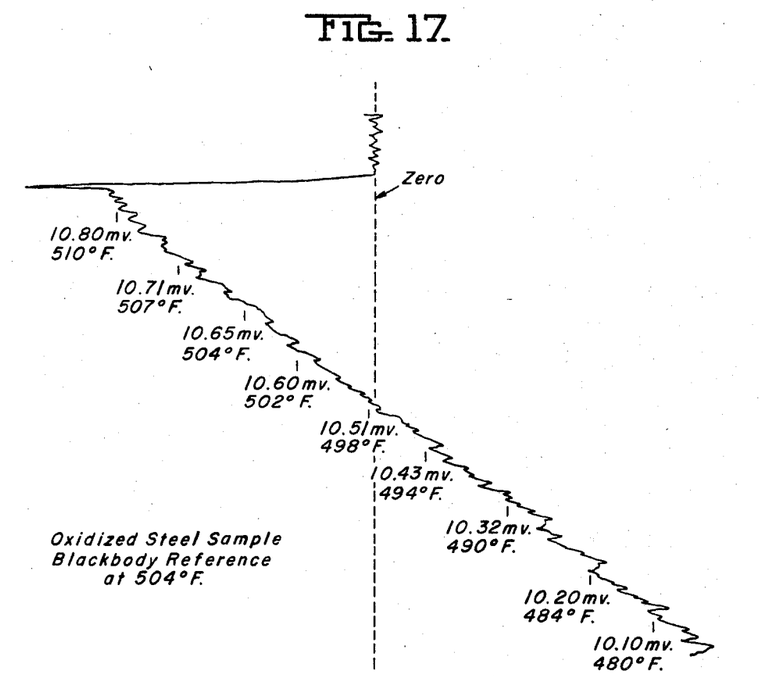
FIGURE 17 shows an oxidized steel sample, blackbody reference at 504° F., and a null output for the sample at 498° F.
Figure 18:
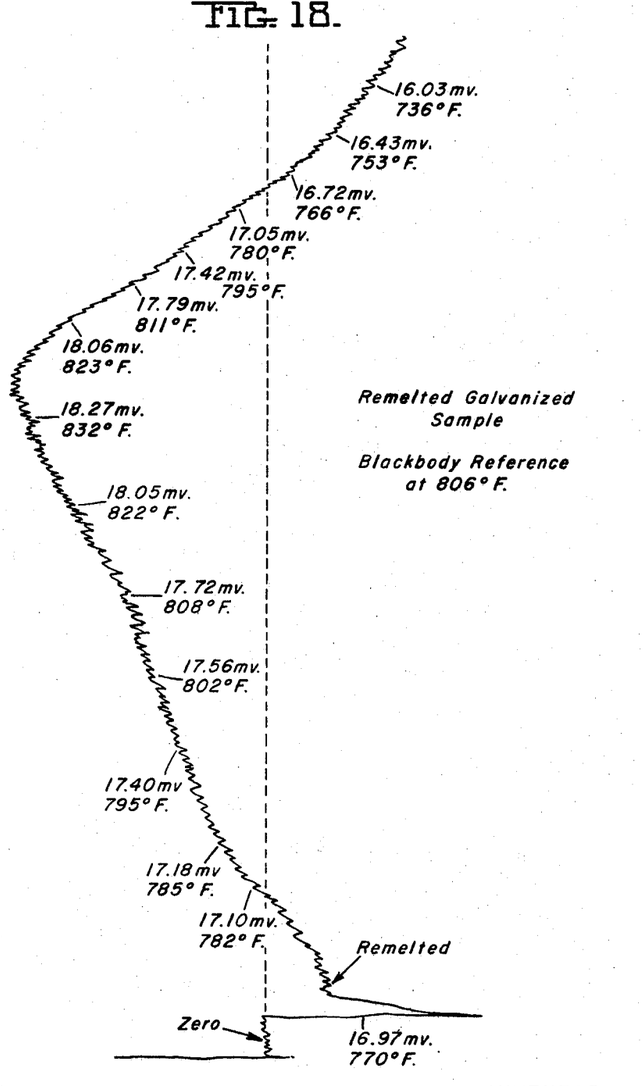
FIGURE 18 shows a remelted galvanized sample, blackbody reference at 806° F.

FIGURES 16 and 17 show similar data taken on a crystalline galvanized sample and an oxidized steel sample at about 500° F., and FIGURE 18 is for a remelted galvanized sample with the reference at 806° F.

Figure 19:
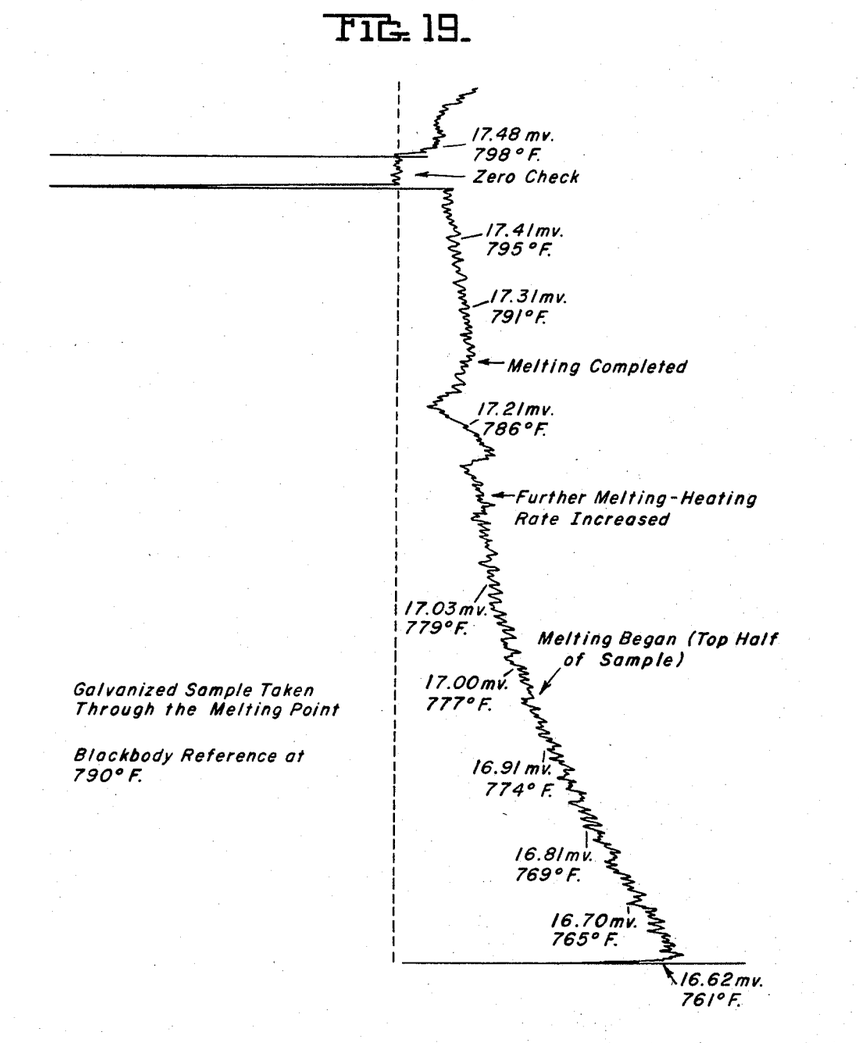
FIGURE 19 shows a galvanized sample taken through the melting point and blackbody reference at 790° F.

FIGURE 19 shows the results obtained while monitoring the temperature of a crystalline galvanized sample as it was taken through the melting point, where large changes in emittance occur. The largest variations from a smooth curve are of the order of ±12° F., and it is not certain whether these were due to the effects of the melting or a change in heating. In any case, the deviations are small.

In FIGURE 15, a temperature difference of the order of 5 or 6° F. results in an error signal of about 1 millivolt. This shows that the apparatus is capable of great sensitivity. The precision is beyond that which can be attained by the comparison of thermocouple measurements on the blackbody 28 and the sample 10.

From the above description it will be understood that such apparatus of this invention provides the beneficial and unobvious features; namely, the phase reference, and the circuitry for discriminating phase as well as the magnitude of the signal output.

Alternatively the apparatus shown in FIGURES 1–8 and FIGURE 12 may be made portable by, for example, mounting the blackbody 28 and detector assembly in a fixed relation to each other by means of a mounting bar (not shown) and positioning the apparatus at the desired orientation with respect to the work sample 10.

*Method*

From the above description of the apparatus shown in FIGURES 1–8 and FIGURE 12, it will be appreciated by those skilled in the art that an improved method for measuring the temperature of a heated sample 10, such as a heated strip in a steel processing mill and the like, has been provided. This improved method comprises the steps of directing blackbody thermal radiation onto the heated sample 10, detecting the polarization of the combined direct thermal radiation and reflected thermal radiation from the heated sample 10 and receiving and transforming the combined direct thermal radiation and reflected thermal radiation from the heated sample 10 into an electric signal. This method includes the steps of using a field stop 58 to insure that the field of view of the detector 32 is filled by both the sample 10 and the blackbody aperture 28a, focusing the combined direct thermal radiation and reflected thermal radiation, attenuating all undesired signals, storing and measuring the signal, amplifying the signal, providing a reference signal, and recording and comparing the signal and the reference signal to indicate relative temperature of the heated sample 10.

*Summary of the achievement of the objects of the invention*

It will be recognized by those skilled in the art that the objects of the present invention have been achieved by providing an improved apparatus for and method of measuring temperatures, which apparatus and method determines the temperature of a sample surface by measurement of the polarization of thermal radiation (both emitted and reflected) from the sample surface, eliminates the correction for the emittance factor of the sample surface, does not require a polished sample surface and can be used on samples of various surface finishes including oxide coatings, locates a null and eliminates quantitative measurements thereby eliminating compensation of the radiation detector for thermal and aging effects (within a relatively large range), and provides a correct reading even when the emittance of the sample surface is changing (as by oxidation) during the course of the temperature measurement.

While in accordance with the patent statutes preferred and alternative embodiments of the present invention have been illustrated and described in detail, it is to be particularly understood that the invention is not limited thereto or thereby.

I claim:
1. Apparatus for measuring the temperature of a body which emits polarized emitted body thermal radiation and having:
   (a) a frame,
   (b) blackbody means on said frame adjacent said body for directing unpolarized blackbody thermal radiation onto said body,
      (1) a portion of said blackbody thermal radiation being reflected by said body as polarized reflected thermal radiation,
      (2) said reflected thermal radiation and said emitted body thermal radiation forming resultant thermal radiation,
   (c) analyzer means disposed on said frame adjacent said body for determining the existence of polarization of said resultant thermal radiation and for producing analyzed resultant thermal radiation, and
   (d) thermal radiation detection means on said frame adjacent said analyzer means for receiving said analyzed resultant thermal radiation and converting said resultant thermal radiation into an output signal.

2. The apparatus recited in claim 1 wherein said apparatus has limiting means on said frame adjacent said body for limiting the field of view of said analyzer means so that said field of view is filled by said body and said blackbody.

3. The apparatus recited in claim 1 and having focusing means on said frame adjacent said detection means for focusing said analyzed resultant thermal radiation into said detection means.

4. The apparatus recited in claim 1 and having filter means on said frame adjacent said detection means for selecting a predetermined wave length band of said analyzed resultant thermal radiation.

5. The apparatus recited in claim 1 and having indicating means on said frame and connected to said detection means for receiving said output signal from said detection means and for indicating the magnitude of said output signal.

6. The apparatus recited in claim 5 and having preamplifier means on said frame connected to said indicating means and said detection means for amplifying said output signal being transmitted to said indicating means.

7. Apparatus for measuring the temperature of a body which emits polarized emitted body thermal radiation, said apparatus having an optical axis and a principal plane of incidence containing said optical axis and the normal to said body at the intersection of said optical axis with said body, said polarized emitted body thermal radiation being predominantly polarized in a direction parallel to said principal plane of incidence, said apparatus having:
  (a) a frame,
  (b) blackbody means on said frame on said optical axis adjacent said body for directing unpolarized blackbody thermal radiation onto said body,
    (1) a portion of said blackbody thermal radiation being reflected by said body as polarized reflected thermal radiation predominantly polarized in a direction perpendicular to the principal plane of incidence,
    (2) said reflected thermal radiation and said emitted body thermal radiation forming resultant thermal radiation,
  (c) analyzer means disposed on said frame on said optical axis for determining the existence of polarization of said resultant thermal radiation, and for producing analyzed resultant thermal radiation, and having a transmission axis movable with respect to said principal plane of incidence,
    (1) said analyzer means being operable, when said body has a temperature greater than the temperature of said blackbody, to transmit a first maximum analyzed resultant thermal radiation when said transmission axis is parallel to said principal plane of incidence,
    (2) said analyzer means being further operable, when said body has a temperature less than the temperature of said blackbody, to transmit a second maximum analyzed resultant thermal radiation when said transmission axis is perpendicular to said principal plane of incidence,
    (3) said analyzer means being further operable, when said body has the same temperature as the temperature of said blackbody, to transmit analyzed resultant thermal radiation which is independent of the angular position of said analyzer means with respect to said principal angle of incidence, and
  (d) thermal radiation detection means on said frame on said optical axis adjacent said analyzer means for receiving said analyzed resultant thermal radiation and converting said analyzed resultant thermal radiation into an alternating output signal.

8. The apparatus recited in claim 7 wherein said apparatus has limiting means on said frame on said optical axis adjacent said body for limiting the field of view of said analyzer means so that said field of view is filled both by said body and said blackbody.

9. The apparatus recited in claim 7 and having focusing means on said frame on said optical axis adjacent said detection means for focusing said analyzed resultant thermal radiation into said detection means.

10. The apparatus recited in claim 7 and having filter means on said frame on said optical axis adjacent said detection means for selecting a predetermined wave length band of said analyzed resultant thermal radiation.

11. The apparatus recited in claim 7 and having indicating means on said frame and connected to said detection means for receiving said alternating output signal from said detection means and for indicating the magnitude of said alternating output signal.

12. The apparatus recited in claim 11 and having preamplifier means on said frame connected to said indicating means and said detection means for amplifying said alternating output signal being transmitted to said indicating means.

13. The apparatus recited in claim 7 wherein said analyzer means has drive means for rotating said analyzer means so as to vary the angle between said principal plane of incidence and said transmission axis and having:
  (a) a reference voltage source means having a rotatable variable voltage member connected to said drive means and having an output which is a function of the angular position of said analyzer means,
  (b) a phase discriminator circuit connected to said reference voltage source means for detecting the phase as well as the magnitude of said alternating output signal from said detection means and for producing a direct current output signal,
  (c) recording means connected to said phase discriminator circuit for recording the magnitude and polarity of said direct current output signal, and
  (d) said variable voltage member being operable to produce a reference input which is in phase with said alternating output signal when said body has a higher temperature than said blackbody and which is out of phase with said alternating output signal when said body has a lower temperature than said blackbody.

14. The apparatus recited in claim 13 wherein said phase discriminator circuit has:
  (a) an input voltage divider connected to said reference input from said phase reference voltage source means,
  (b) said alternating output signal being connected to said input voltage divider to add said alternating output signal to said reference input to form a resultant signal,
  (c) rectifying means connected to said input voltage divider for rectifying said resultant signal, and
  (d) output voltage divider means connected to said rectifying means and said alternating output signal.

15. Apparatus for measuring the temperature of a body which emits polarized emitted body thermal radiation, said apparatus having an optical axis and a principal plane of incidence containing said optical axis and the normal to said body at the intersection of said optical axis with said body, said polarized emitted body thermal radiation being predominantly polarized in a direction parallel to said principal plane of incidence, said apparatus having:
  (a) a frame,
  (b) blackbody means on said frame on said optical axis adjacent said body for directing unpolarized blackbody thermal radiation onto said body,
    (1) a portion of said blackbody thermal radiation being reflected by said body as polarized reflected thermal radiation predominantly polarized in a direction perpendicular to the principal plane of incidence,
    (2) said reflected thermal radiation and said emitted body thermal radiation forming resultant thermal radiation,
  (c) analyzer means disposed on said frame on said optical axis for determining the existence of polarization of said resultant thermal radiation, and for producing analyzed resultant thermal radiation, and having a first transmission axis parallel to said principal plane of incidence and a second transmission axis perpendicular to said principal plane of incidence,
(1) said analyzer means being operable, when said body has a temperature greater than the temperature of said blackbody, to transmit analyzed resultant thermal radiation having a first maximum component parallel to said first transmission axis,
(2) said analyzer means being further operable, when said body has a temperature less than the temperature of said blackbody, to transmit analyzed resultant thermal radiation having a second maximum component parallel to said second transmission axis,
(3) said analyzer means being further operable, when said body has the same temperature as the temperature of said blackbody, to transmit analyzed resultant thermal radiation having substantially equal components parallel to said first transmission axis and to said second transmission axis, and
(d) thermal radiation detection means on said frame on said optical axis adjacent said analyzer means for receiving said analyzed resultant thermal radiation and converting said analyzed resultant thermal radiation into a first output signal and a second output signal.

16. The apparatus recited in claim 15 wherein said apparatus has limiting means on said frame on said optical axis adjacent said body for limiting the field of view of said analyzer means so that said field of view is filled both by said body and said blackbody.

17. The apparatus recited in claim 15 and having focusing means on said frame on said optical axis adjacent said detection means for focusing said analyzed resultant thermal radiation into said detection means.

18. The apparatus recited in claim 15 and having filter means on said frame on said optical axis adjacent said detection means for selecting a predetermined wave length band of said analyzed resultant thermal radiation.

19. The apparatus recited in claim 15 and having indicating means on said frame and connected to said detection means for receiving said first output signal and said second output signal from said detection means and for indicating the magnitude of said first output signal and said second output signal.

20. The apparatus recited in claim 19 and having preamplifier means on said frame connected to said indicating means and said detection means for amplifying said first output signal and said second output signal being transmitted to said indicating means.

21. An improved method for measuring the temperature of a body which emits polarized emitted body thermal radiation and comprising the steps of:
(a) directing unpolarized blackbody thermal radiation from a blackbody onto said body so that a portion of said unpolarized blackbody thermal radiation is reflected by said body as polarized reflected thermal radiation,
(1) said reflected thermal radiation and said emitted body thermal radiation forming resultant thermal radiation,
(b) passing resultant thermal radiation through analyzer means to determine the existence of polarization of said resultant thermal radiation and to produce analyzed resultant thermal radiation, and
(c) receiving said analyzed resultant thermal radiation and converting said analyzed resultant thermal radiation into an output signal.

22. The method recited in claim 21 and including the step of limiting the field of view of said analyzer means so that said field of view is filled by said body and said blackbody.

23. The method recited in claim 21 and including the step of focusing said analyzed resultant thermal radiation prior to receiving and converting said analyzed resultant thermal radiation.

24. The method recited in claim 21 and including the step of selecting a predetermined wave length band of said analyzed resultant thermal radiation.

25. The method recited in claim 21 and including the step of receiving said output signal and of indicating the magnitude of said output signal.

26. The method recited in claim 25 and including the step of amplifying said output signal being transmitted.

27. An improved method for measuring the temperature of a body which emits polarized emitted body thermal radiation, said polarized emitted body thermal radiation being predominantly polarized in a direction parallel to a plane of incidence containing a normal to said body and a normal to an adjacent blackbody, said plane of incidence being perpendicular to said body and to said blackbody, said method comprising the steps of:
(a) directing unpolarized blackbody thermal radiation from said blackbody onto said body so that a portion of said unpolarized blackbody thermal radiation is reflected by said body as polarized reflected thermal radiation predominantly polarized in a direction perpendicular to said plane of incidence,
(1) said reflected thermal radiation and said emitted body thermal radiation forming resultant thermal radiation,
(b) passing said resultant thermal radiation through analyzer means having a transmission axis movable with respect to said plane of incidence to determine the existence of polarization of said resultant thermal radiation, and to produce analyzed resultant thermal radiation,
(c) moving said analyzer means so that, when said body has a temperature greater than the temperature of said blackbody, a first maximum analyzed resultant thermal radiation is transmitted when said transmission axis is parallel to said plane of incidence,
(d) further moving said analyzer means so that, when said body has a temperature less than the temperature of said blackbody, a second maximum analyzed resultant thermal radiation is transmitted when said transmission axis is perpendicular to said plane of incidence,
(e) further moving said analyzer means so that, when said body has the same temperature as the temperature of said blackbody, analyzed resultant thermal radiation is transmitted which is independent of the angular position of said analyzer means with respect to said angle of incidence, and
(f) receiving said analyzed resultant thermal radiation and converting said analyzed resultant thermal radiation into an alternating output signal.

28. The method recited in claim 27 and including the step of limiting the field of view of said analyzer means so that said field of view is filled by said body and said blackbody.

29. The method recited in claim 27 and including the step of focusing said analyzed resultant thermal radiation prior to receiving and converting said analyzed resultant thermal radiation.

30. The method recited in claim 27 and including the step of selecting a predetermined wave length band of said analyzed resultant thermal radiation.

31. The method recited in claim 27 and including the step of receiving said alternating output signal and of indicating the magnitude of said alternating output signal.

32. The method recited in claim 31 and including the step of amplifying said alternating output signal being transmitted.

33. An improved method for measuring the temperature of a body which emits polarized emitted body thermal radiation, said polarized emitted body thermal radiation being predominantly polarized in a direction parallel to a plane of incidence containing a normal to said body and a normal to an adjacent blackbody, said plane of incidence being perpendicular to said body and to said blackbody, said method comprising the steps of:
(a) directing unpolarized blackbody thermal radiation from said blackbody onto said body so that a portion of said unpolarized blackbody thermal radiation is reflected by said body as polarized reflected thermal radiation predominantly polarized in a direction perpendicular to said plane of incidence,
(1) said reflected thermal radiation and said emitted body thermal radiation forming resultant thermal radiation,
(b) passing said resultant thermal radiation through analyzer means having a first transmission axis parallel to said principal plane of incidence and a second transmission axis perpendicular to said principal plane of incidence, to determine the existence of said resultant thermal radiation and to produce analyzed resultant thermal radiation so that,
(1) when said body has a temperature greater than the temperature of said blackbody, analyzed resultant thermal radiation having a first maximum component parallel to said first transmission axis is transmitted,
(2) when said body has a temperature less than the temperature of said blackbody, analyzed resultant thermal radiation having a second maximum component parallel to said second transmission axis is transmitted, and
(3) when said body has the same temperature as the temperature of said blackbody, analyzed resultant thermal radiation having substantially equal components parallel to said first transmission axis and to said second transmission axis is transmitted, and
(c) receiving said analyzed resultant thermal radiation and converting said analyzer resultant thermal radiation into a first output signal and a second output signal.

34. The method recited in claim 27 and including the steps of:
(a) providing a variable voltage having an output which is a function of the angular position of said analyzer means,
(b) detecting the phase as well as the magnitude of said alternating output signal,
(c) recording the phase and magnitude of said alternating output signal, and
(d) varying said variable voltage to produce a reference input which is in phase with said alternating output signal from said analyzer means when said body has a higher temperature than said blackbody, and which is out of phase with said alternating output signal from said analyzer means when said body has a lower temperature than said blackbody.

35. The method recited in claim 34 and including the steps of:
(a) introducing a phase reference signal,
(b) adding said alternating output signal to said phase reference signal to form a resultant signal,
(c) rectifying said resultant signal to produce a D-C output signal, and
(d) displaying said D-C output signal.

36. The method recited in claim 33 and including the step of limiting the field of view of said analyzer means so that said field of view is filled by said body and said blackbody.

37. The method recited in claim 33 and including the step of focusing said analyzed resultant thermal radiation prior to receiving and converting said analyzed resultant thermal radiation.

38. The method recited in claim 33 and including the step of selecting a predetermined wave length band of said analyzed resultant thermal radiation.

39. The method recited in claim 33 and including the step of receiving said first output signal and said second output signal and of indicating the magnitude of said first output signal and said second output signal.

40. The method recited in claim 39 and including the step of amplifying said first output signal and said second output signal being transmitted.

References Cited

UNITED STATES PATENTS 2,837,917   6/1958   Machler.
3,358,974   10/1967   Bernard.

S. CLEMENT SWISHER, *Primary Examiner.*

FREDERICK SHOON, *Assistant Examiner.*

U.S. Cl. X.R.

88—14, 22.5

UNITED STATES PATENT OFFICE
CERTIFICATE OF CORRECTION

Patent No. 3,422,678                                            January 21, 1969

Thomas P. Murray

It is certified that error appears in the above identified patent and that said Letters Patent are hereby corrected as shown below:

Column 3, line 40, before "body" insert -- heated --. Column 6, line 51, "(emission equals absorption)" should read -- (emission equals absorptance of an object) --; lines 52 and 53, cancel "of an object". Column 7, line 21, "New York" should read -- Long Island --. Column 8, line 13, after "Conversely" insert -- since --.

Signed and sealed this 17th day of March 1970.

(SEAL)
Attest:

Edward M. Fletcher, Jr.                          WILLIAM E. SCHUYLER, JR.
Attesting Officer                                     Commissioner of Patents